(12) United States Patent
Iordache et al.

(10) Patent No.: US 9,389,426 B2
(45) Date of Patent: Jul. 12, 2016

(54) LIGHT CONSOLIDATION ASSEMBLY

(71) Applicant: Tyco Electronics Canada ULC, Markham (CA)

(72) Inventors: Lucian Iordache, Woodbridge (CA); Andras Gyimes, Toronto (CA)

(73) Assignee: TYCO ELECTRONICS CANADA ULC, Markham (CA)

( * ) Notice: Subject to any disclaimer, the term of this patent is extended or adjusted under 35 U.S.C. 154(b) by 71 days.

(21) Appl. No.: 14/087,692

(22) Filed: Nov. 22, 2013

(65) Prior Publication Data

US 2015/0146450 A1 May 28, 2015

(51) Int. Cl.
*G02B 27/10* (2006.01)
*F21V 8/00* (2006.01)
*G02B 27/09* (2006.01)

(52) U.S. Cl.
CPC .......... *G02B 27/1006* (2013.01); *G02B 6/0096* (2013.01); *G02B 27/0905* (2013.01); *G02B 27/0994* (2013.01)

(58) Field of Classification Search
CPC .............. G02B 6/0006; G02B 6/2804–6/2861; G02B 6/0096; G02B 27/1006; G02B 27/0994; G02B 27/0905
USPC ................ 385/39–51; 362/551–556
See application file for complete search history.

(56) References Cited

U.S. PATENT DOCUMENTS

| | | | |
|---|---|---|---|
| 3,453,036 A * | 7/1969 | Koester et al. .................. 385/45 |
| 3,455,625 A * | 7/1969 | Ferris et al. ..................... 385/54 |
| 4,184,739 A * | 1/1980 | d'Auria et al. .................. 385/45 |
| 4,496,211 A * | 1/1985 | Daniel ............................ 385/31 |
| 4,744,629 A * | 5/1988 | Bertoglio et al. ............... 385/59 |
| 5,218,466 A | 6/1993 | Brooks |
| 5,324,932 A * | 6/1994 | Niewisch ................. 250/227.21 |
| 6,095,673 A | 8/2000 | Goto et al. |
| 6,278,827 B1 | 8/2001 | Sugiyama et al. |
| 6,714,711 B1 | 3/2004 | Lieberman et al. |
| 6,883,949 B2 | 4/2005 | Goto et al. |
| 7,151,867 B2 * | 12/2006 | Pignot et al. .................... 385/15 |
| 7,194,184 B2 | 3/2007 | Buelow, II et al. |
| 7,286,296 B2 | 10/2007 | Chaves et al. |
| 7,717,597 B2 | 5/2010 | Dolson et al. |
| 7,866,860 B2 | 1/2011 | Goto |
| 8,147,110 B2 | 4/2012 | Goto et al. |
| 2010/0091515 A1 | 4/2010 | Goto et al. |
| 2011/0032726 A1 * | 2/2011 | Luca et al. .................... 362/555 |

* cited by examiner

*Primary Examiner* — Anh Mai
*Assistant Examiner* — Arman B Fallahkhair (57) ABSTRACT

A light consolidation assembly for attaching to a light pipe includes a housing having therein at least a first light source configured to generate a first light and a second light source configured to generate a different, second light. The light consolidation assembly also includes a light consolidator having a body including a light entry end coupled to the housing and a light exit end. The light entry end has multiple spaced-apart branches that converge into a stem that extends from the multiple branches to the light exit end. The light consolidator is configured to receive the first and second lights into respective first and second branches of the multiple branches. The first and second lights are directed into the stem and exit the light consolidator at the light exit end for transmission through a light pipe disposed at the light exit end of the light consolidator.

18 Claims, 4 Drawing Sheets

LIGHT CONSOLIDATION ASSEMBLY

BACKGROUND OF THE INVENTION

The subject matter herein relates generally to a light consolidation assembly for light pipes.

Current lighting applications use a light source, such as a light emitting diode (LED), and a light pipe to distribute the light in the desired configuration. Such lighting applications may include, for example, automotive interior ambient lighting, automotive exterior lighting, lighting in household devices, and the like. The light pipe is typically a cylindrical, transparent structure used to channel or transmit the light longitudinally along the length of the light pipe by internal reflection. In some applications, it is desirable for an installed light system to have a dual light capability. For example, it is desirable for the light system to be able to switch between at least two colors of light emanating through the light pipe. Such a lighting system in an automobile application, for example, may allow a passenger to change colors of the light by a switch on a user interface that controls the output of one or more light sources. In typical automotive lighting applications, to change the color in linear lighting, the light system must be uninstalled, disassembled, and the light driver replaced, which is time and energy intensive and inefficient. Another known way to achieve dual light capability is to assemble two different light systems side by side, each system having a different color of light, and only provide power to one system at a time. However, installing two lighting systems to provide only a single light at a time is bulky and costly.

A need remains for a lighting system with the capability to repeatably switch between at least two colors of light in a single light pipe.

BRIEF DESCRIPTION OF THE INVENTION

In one embodiment, a light consolidation assembly for attaching to a light pipe is provided including a housing having multiple light sources mounted within the housing. The light sources include at least a first light source configured to generate a first light and a second light source configured to generate a different, second light. The light consolidation assembly also includes a light consolidator having a body that includes a light entry end coupled to the housing and a light exit end. The light entry end has multiple branches that are spaced-apart and converge into a stem that extends from the branches to the light exit end. The light consolidator is configured to receive the first light into the light entry end of a first branch of the multiple branches and the second light into the light entry end of a second branch of the multiple branches. The first and second lights are directed into the stem and exit the light consolidator at the light exit end as an output light for transmission through a light pipe disposed at the light exit end of the light consolidator.

In another embodiment, a light consolidation assembly is provided including a housing having multiple light sources mounted within the housing. The light sources include at least a first light source configured to generate a first light and a second light source configured to generate a different, second light. The light consolidation assembly also includes a light consolidator having a body that includes a light entry end coupled to the housing. The light entry end has multiple branches that are spaced-apart and converge into a stem that extends from the branches to a light exit end of the body. The light consolidator defines a cavity at the light exit end. A light pipe is attached to the light consolidator. The light pipe has an attachment end that is received in the cavity at the light exit end. The light consolidator is configured to receive the first light into the light entry end of a first branch of the multiple branches and the second light into the light entry end of a second branch of the multiple branches. The first and second lights are directed into the stem and exit the light consolidator through the cavity at the light exit end as an output light for transmission through the light pipe.

In a further embodiment, a light consolidation assembly is provided including a light consolidator having a body extending between a light entry end and a light exit end. The light entry end has multiple branches that are spaced-apart and converge into a stem that extends from the branches to the light exit end. The light consolidation assembly also includes a housing coupled to the branches of the light consolidator. The housing has multiple light sources mounted therein. The light sources include at least a first light source configured to generate a first light and a second light source configured to generate a different, second light. The housing defines multiple channels configured to provide optical paths from the light sources to the branches of the light consolidator. A light pipe is attached to the light exit end of the light consolidator. The light consolidator is configured to receive the first light through a first channel of the multiple channels into a first branch of the multiple branches and the second light through a second channel of the multiple channels into a second branch of the multiple branches. The first and second lights are directed into the stem and exit the light consolidator at the light exit end as an output light for transmission through the light pipe.

DETAILED DESCRIPTION OF THE INVENTION

One or more embodiments of the subject matter herein describe a light consolidation assembly that consolidates light from multiple light sources, such as light emitting diodes (LEDs), to at least one light pipe. The light generated by the light sources may have different optical properties and/or characteristics, such as different colors. The light consolidation assembly includes a light consolidator (e.g., distributor or adapter) that combines input light from different light sources positioned at spaced-apart locations into a single output light that propagates through an attached light pipe. The output light within the light pipe is generally the only light that is visible from the light consolidation assembly when installed in an application, such as when used for interior automobile lighting, household devices, and the like.

The light consolidation assembly may be configured to adjust the characteristics of the output light in the light pipe by controlling the characteristics of the individual lights generated by the light sources prior to the lights mixing in the light consolidator. For example, a controller may be configured to change properties, such as frequency, polarization, and/or luminous flux (e.g., luminous power), of the light generated from one or more of the light sources. The controller may include electrical switches to modify the light that is output from the light sources. Therefore, characteristics like the color and luminous intensity (e.g., luminance) of the output light in the light pipe, which is externally visible, may be adjusted without replacing the driver or disassembling any of the components of the light consolidation assembly. As used herein, luminous flux and luminous power generally stand for a measure of the power of light emitted by a light source. As used herein, luminous intensity and luminance generally indicate how much luminous power may be detected by a person looking at the surface of the light pipe from a particular angle of view.

The light consolidator within the light consolidation assembly may be sized and shaped to preserve desired color uniformity from different light source combinations. The light consolidator may create equivalent optical paths for the different light sources, and may present a large number of internal specular reflections per unit of length. The optical paths may join within the light consolidator such that the different lights may interact and mix prior to being emitted from the light consolidator as output light. The output light, then, is a mixture of the individual lights received by the different light sources. As the characteristics of the incoming lights are modified by the respective light sources, so too is the resulting output light. The large number of internal specular reflections within the light consolidator may decrease the probability of large chromatic distances within a given area at the output of the light consolidator. In an exemplary embodiment, the light consolidator couples the output of two LEDs, one RGB and one standard white, to a light pipe in such a way that the average light pathway is the same irrespective of which LED is emitting light. The light consolidator may present a uniform spatial distribution of the RGB components of the RGB LED for an even chromatic distribution. Optionally, the light consolidator may include at least two RGB LEDs that are separately controlled to generate light having different optical characteristics.

Figure 1:
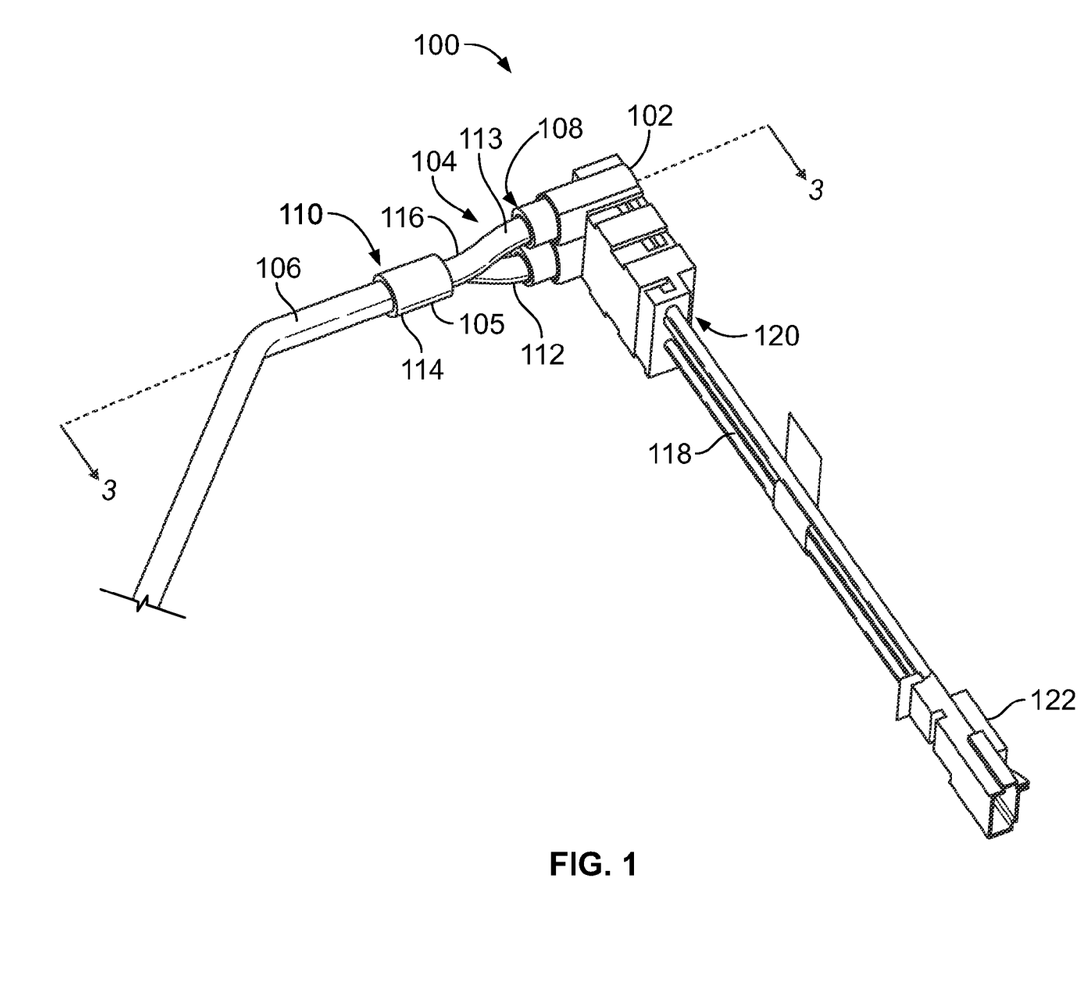
FIG. 1 is a perspective view of a light consolidation assembly according to an exemplary embodiment.

FIG. 1 is a perspective view of a light consolidation assembly 100 according to an exemplary embodiment. The light consolidation assembly 100 includes a housing 102, a light consolidator 104, and a light pipe 106. The light consolidator 104 includes a body 105 that extends between a light entry end 108 and a light exit end 110. The light entry end 108 is adjacent to the housing 102, and the light exit end 110 is adjacent to the light pipe 106. The light consolidator 104 is coupled to the housing 102 at the light entry end 108 and to the light pipe 106 at the light exit end 110. Light generated in the housing 102 enters the light consolidator 104 at the light entry end 108. The light propagates through the interior of the light consolidator 104. The light exits the light consolidator 104 at the light exit end 110 as an output light. The output light enters the light pipe 106 from the light consolidator 104 and is emitted from the light pipe 106 to illuminate the surrounding environment.

In an exemplary embodiment, the body 105 of the light consolidator 104 includes multiple branches 112, 113 that diverge from a single stem 114. The multiple branches 112, 113 are spaced-apart, and distal ends of the multiple branches 112, 113 define the light entry end 108 of the light consolidator 104. The stem 114 extends from a place of convergence or divergence of the branches 112, 113 to the light exit end 110. The place of convergence of the branches 112 into the stem 114 may be referred to herein as a node 116. In an exemplary embodiment, the light consolidator 104 is Y-shaped and has two branches—a first branch 112 and a second branch 113—that diverge from the stem 114 at the node 116. In alternate embodiments, the light consolidator 104 may have three, four, or more branches extending from the stem 114.

The housing 102 has multiple light sources 206, 207 (shown in FIG. 2) mounted within the housing 102 that are each configured to generate a corresponding light. Power and/or communication wires 118 protruding from a bottom 120 of the housing 102 may be electrically connected to the light sources 206, 207 to provide power and/or control signals to control light generation. The wires 118 may be terminated to a connector 122 for mating with a device, a power source, a printed circuit board (PCB), and/or the like.

In an exemplary embodiment, light beams from each of the multiple light sources 206, 207 (shown in FIG. 2) are generated, either separately or simultaneously, and received at the light entry end 108 of corresponding branches 112, 113 that are proximate to the light sources 206, 207. The light beams propagate through the corresponding branches 112, 113 to the node 116. The light beams may mix and/or interact with each other when consolidated at the node 116. Further interaction between the light beams may occur downstream of the node 116 within the stem 114. The light exits the light consolidator 104 at the light exit end 110 as an output light. In an exemplary embodiment, the color and/or luminance of the output light that exits the light consolidator 104 may be modified by changing one or more optical characteristics of at least one of the light beams generated at the light sources 206, 207. Additionally or alternatively, the color and/or luminance of the output light may be modified by supplying power to only one light source 206 or 207 instead of both 206 and 207, or by supplying power to different combinations of light sources in embodiments having more than two light sources.

The output light is received in the light pipe 106 from the light consolidator 104 at the light exit end 110 and is transmitted through the light pipe 106. The light pipe 106 transmits the output light internally along the length of the pipe 106 to a remote area to be illuminated (e.g., to illuminate only the distal end of the light pipe 106 or a device such as a lens, additional light pipe, etc. connected to the distal end of the light pipe 106). Optionally, the light pipe 106 may emit light along the length of the pipe 106 to illuminate an area along which the light pipe 106 extends (e.g., to illuminate a surface or edge of a structure for safety or other reasons).

Figure 2:
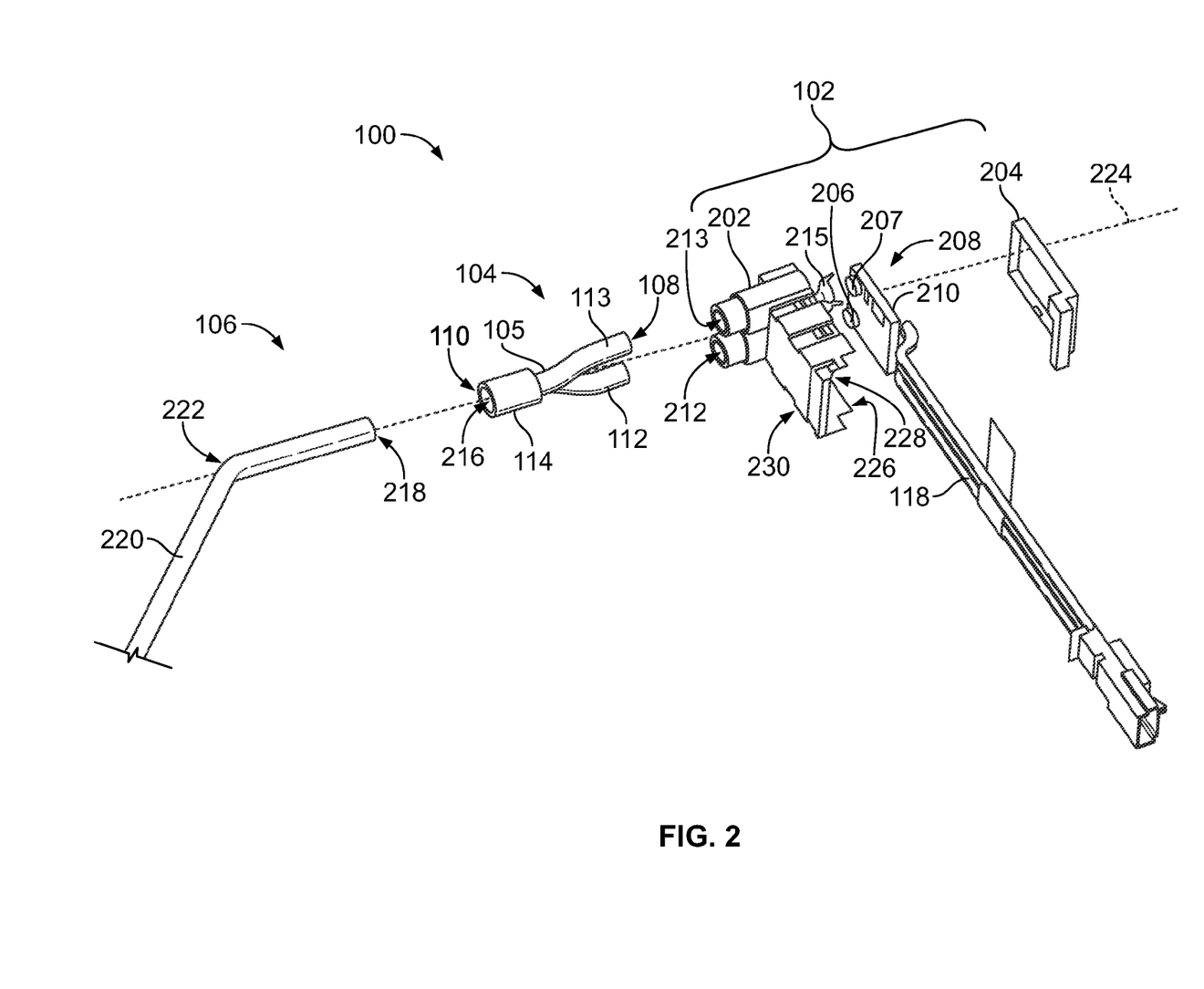
FIG. 2 is an exploded view of the light consolidation assembly of FIG. 1.

FIG. 2 is an exploded view of the light consolidation assembly 100. Light may be generated by multiple light sources 206, 207 that are operatively coupled to a light engine 208 that is mounted within the housing 102. The light engine 208 includes a PCB 210. In an exemplary embodiment, the light engine 208 is a double light engine including two light sources—a first light source 206 and a second light source 207—although more than two light sources may be used in other embodiments. The first light source 206 is configured to generate a first light, and the second light source 207 is configured to generate a different, second light. The light sources 206, 207 may be light emitting diodes (LEDs). Alternately, other types of light sources may be suitable for use within the light engine 208. The light sources 206, 207 are electrically coupled to the PCB 210. Optionally, the light sources 206, 207 may be mounted on the PCB 210. The PCB 210 may include drivers and/or controllers (not shown) embedded within the PCB 210 that are configured to control the light that is generated by each of the light sources 206, 207. The wires 118 may be fixed (e.g., soldered, glued, or mechanically fixed) to the PCB 210 to provide power and/or control signals to the light engine 208. The light engine 208 controls one or more optical characteristics of the first and second lights that are generated by the respective first and second light sources 206, 207. For example, the light engine 208 may provide power to the light sources 206, 207 as well as adjust the frequency, luminous flux, and/or polarization of the first and/or second light to alter the respective generated light beams emitted from the light sources 206, 207.

In an exemplary embodiment, the first light source 206 is a red-green-blue (RGB) LED that emits red, green, and blue light. The second light source 207 is a monochromatic LED, such as a white LED, that emits monochromatic white light. In another embodiment, both the first and the second light sources 206, 207 may be RGB LEDs. In other embodiments, both the first and the second light sources 206, 207 are monochromatic LEDs, emitting different light such as warm white light and cool white light. As known to those skilled in the art, each light color has an associated dominant wavelength (e.g., frequency). Accordingly, each color is reflected in the light consolidation assembly 100 according to its associated dominant wavelength.

The housing 102 is formed as an assembly that includes a front housing 202 and a rear housing or cover 204. The front housing 202 and cover 204 may be formed of a plastic, such as polybutylene terephthalate (PBT), polyethylene terephthalate (PET), and/or the like. The front housing 202 and the cover 204 are configured to at least partially surround the multiple light sources 206, 207 when the cover 204 is assembled to the front housing 202. The front housing 202 and the cover 204 may provide electrical insulation for the electronic components, such as the light sources 206, 207 and associated circuitry, mounted within the assembled housing 102. The front housing 202 of the housing 102 defines multiple channels 212, 213 that extend through the front housing 202 and are configured to provide optical paths from the light sources 206, 207 to the corresponding branches 112, 113 of the light consolidator 104. The light engine 208 is mounted within the front housing 202 such that the light source 206 aligns generally with the channel 212, and the light source 207 aligns generally with the channel 213.

In an exemplary embodiment, a first lens 214 (shown in FIG. 4) is positioned within the channel 212 proximate to the first light source 206, and a second lens 215 is positioned within the channel 213 proximate to the second light source 207 when the light consolidation assembly 100 is assembled. For example, the lenses 214, 215 are positioned between each of the light sources 206, 207 and the corresponding one of the branches 112, 113. The lenses 214, 215 may be formed of a light transmissive plastic material, such as polycarbonate and/or acrylic. The lenses 214, 215 are configured to focus light rays from the corresponding light sources 206, 207 towards the light entry end 108 of the corresponding branches 112, 113 of the light consolidator 104. The lenses 214, 215 may refract and collimate the light rays emanating from the light sources 206, 207 to focus the first and second lights within the light entry end 108 of the branches 112, 113.

The body 105 of the light consolidator 104 may be solid and formed of a light transmissive material in order to transmit light within. For example, the material of the light consolidator 104 may be acrylic and/or polycarbonate. The light consolidator 104 may be transparent (e.g., clear) or at least translucent to allow light to pass through. The branches 112, 113 may be integrally formed with the stem 114 as a single unitary body 105. The stem 114 and branches 112, 113 of the light consolidator 104 may each be generally tubular, having circular or elliptical cross-sections. The branches 112, 113 may be spaced radially from each other along an axis defined by the stem 114 to retain equivalent optical paths for the different light sources. Optionally, the light consolidator 104 may include a layer (not shown) of a reflective material or a plurality of reflective surfaces (not shown) configured to reflect the light within the light consolidator 104. The reflective layer and/or surfaces are configured to hinder the light rays that impinge upon the layer or the surfaces from refracting through the surface and emanating from the light consolidator 104 before reaching the light exit end 110. For example, the reflective material or reflective surfaces may have a mirror finish.

The light consolidator 104 defines a cavity 216 at the light exit end 110 of the stem 114. The cavity 216 is configured to receive an attachment end 218 of the light pipe 106 to attach the light pipe 106 to the light consolidator 104.

The light pipe 106 may have a solid body 220 formed from a light transmissive plastic material, such as acrylic and/or polycarbonate. The light pipe 106 may be transparent or at least translucent. The light pipe 106 is generally cylindrical, having a circular or elliptical cross-section. The light pipe 106 may be straight or may have at least one bend 222, as shown in FIG. 2. The material and shape of the light pipe 106 permits light generated by one or more of the light sources 206, 207 to propagate through the light pipe 106 along a length of the light pipe 106 through internal reflection. In alternative embodiments, other suitable materials may be used for the light pipe 106 and/or the light consolidator 104. The light pipe 106 includes an attachment end 218 that is received into the cavity 216 of the light consolidator 104 during assembly. The attachment end 218 may be co-extensive, having the same cross-section and shape, as the rest of the length of the light pipe 106. Alternatively, the attachment end 218 may include a protrusion, groove, coating, and/or the like to facilitate coupling with the light consolidator 104. Optionally, the light pipe 106 may include a layer (not shown) of reflective material elongated at least partially along the length of the light pipe 106. For example, the layer may be over-molded onto the light pipe 106, formed with the light pipe 106, such as by co-extruding the light pipe 106 with the layer, or applied onto the light pipe 106. Optionally, the layer may be opaque to absorb light beams that impinge upon it in order to prevent light from emanating from the light pipe 106 in specified directions.

During assembly, the components are generally mated along the assembly axis 224. For example, the lenses 214, 215 (lens 214 shown in FIG. 4) are loaded into the channels 212, 213, respectively. The light engine 208, including the PCB 210 and the light sources 206, 207, is mounted within the front housing 202 of the housing 102. The light engine 208 is positioned such that the light source 206 aligns with an opening to the channel 212 of the front housing 202 adjacent to the lens 214, and the light source 207 aligns with an opening to the channel 213 adjacent to the lens 215. The cover 204 couples to a rear side 226 of the front housing 202, defining the housing 102. The housing 102 at least partially surrounds the light engine 208 located within a pocket 228 that is created between the front housing 202 and the cover 204. The light engine 208 may be mounted within the housing 102 using latches, adhesive, interference fits, and/or by configuring the pocket 228 to have tight tolerances around the light engine 208 to retain the light engine 208 in a fixed position.

The light entry end 108 of each branch 112, 113 of the light consolidator 104 is loaded into the corresponding channel 212, 213, respectively, from the front side 230 of the front housing 202. The branches 112, 113 may be retained within the channels 212, 213 by an interference fit. Optionally, an adhesive and/or a mechanical latching feature may be used to retain the branches 112, 113 within the channels 212, 213 to prohibit unintentional uncoupling of the light consolidator 104 from the housing 102. The light pipe 106 is attached to the light consolidator 104 by loading the attachment end 218 of the light pipe 106 axially into the cavity 216 at the light exit end 110 of the light consolidator 104. The light pipe 106 may be retained in the cavity 216 by an interference fit, but optionally adhesives and/or mechanical latching features may be used to provide further retention means.

Figure 3:
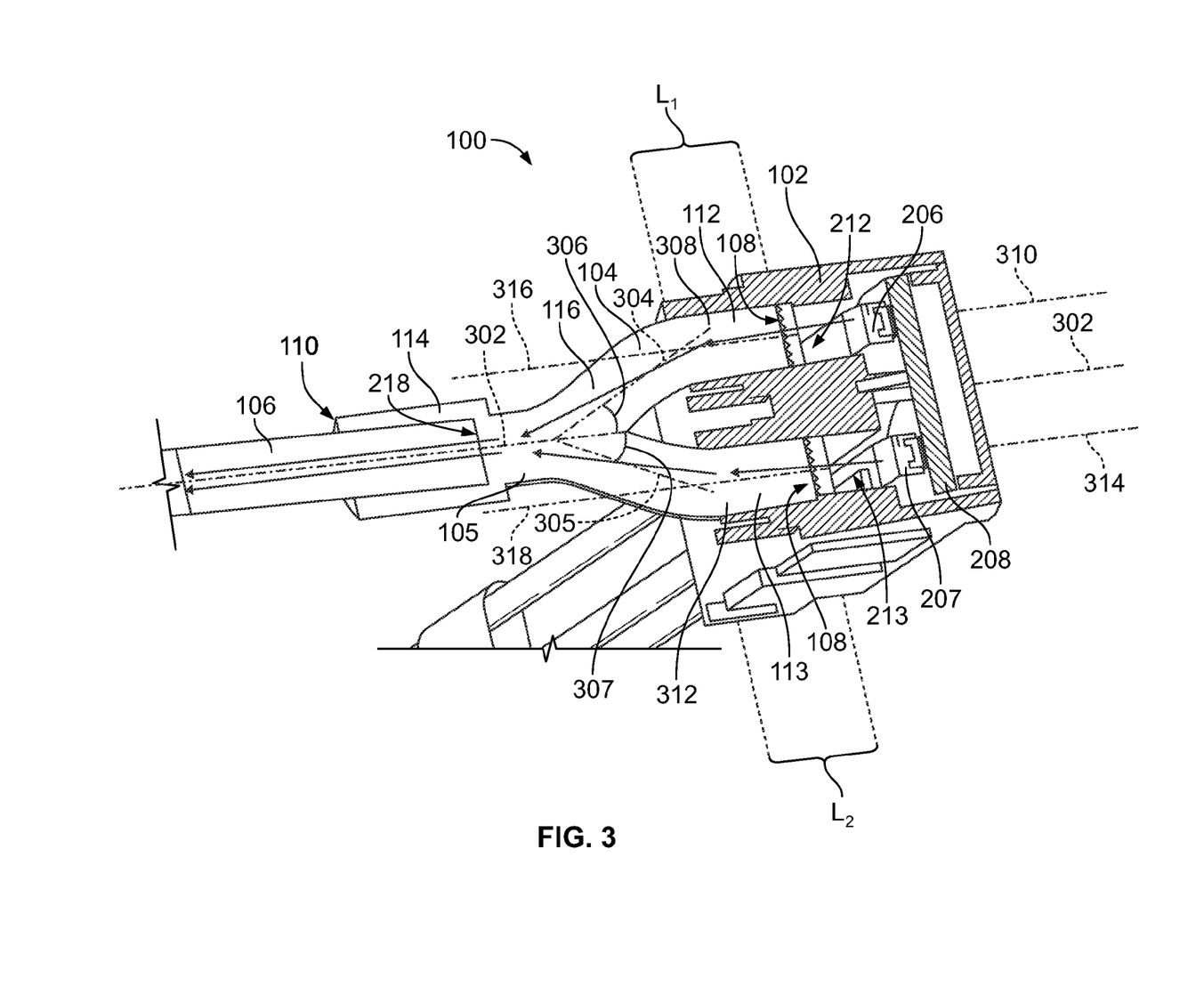
FIG. 3 is a partial sectional view of the light consolidation assembly of FIG. 1.

FIG. 3 is a partial sectional view of the light consolidation assembly 100 along line 3-3 of FIG. 1. The body 105 of the light consolidator 104 may extend generally symmetrically along an axis 302. The stem 114 may extend in-line with the axis 302. The branches 112, 113 may be offset laterally from the axis 302 when the branches 112, 113 diverge from the stem 114 at the node 116. The branches 112, 113 may diverge from the stem 114 at angles with respect to one another and with respect to the longitudinal axis 302 of the body 105. For example, the branch 112 diverts from the stem 114 along secondary axis 304, and the branch 113 diverts from the stem 114 along secondary axis 305. As shown in FIG. 3, the secondary axis 304 is oriented at an oblique angle 306 with respect to the longitudinal axis 302, and the secondary axis 305 is oriented at an oblique angle 307 with respect to the longitudinal axis 302. By way of example only, at least one of the angles 306, 307 may be approximately 17.5, 20.0, 22.5, 25.0, 27.5, 30.0, or 35.0 degrees. In an exemplary embodiment, the angle 306 between the secondary axis 304 and the longitudinal axis 302 is equal to the angle 307 between the secondary axis 305 and the longitudinal axis 302. In an alternative embodiment, the angles 306, 307 are not the same such that the secondary axes 304, 305 are not symmetrical.

In an exemplary embodiment, the branch 112 includes a mating section 308 that extends from the light entry end 108 towards the stem 114 for a designated length L1. The mating section 308 is a linear section that is oriented along a first tertiary axis 310. The tertiary axis 310 may be parallel to the longitudinal axis 302. Likewise, the branch 113 may include a mating section 312 extending from the light entry end 108 towards the stem 114 for a designated length L2. The mating section 312 is linear and oriented along a second tertiary axis 314, which may be parallel to the longitudinal axis 302. The mating sections 308, 312 are aligned with the channels 212, 213, respectively, of the housing 102 for coupling the light consolidator 104 to the housing 102. Although the tertiary axes 310, 314 are parallel to the longitudinal axis 302 in the illustrated embodiment, in alternative embodiments the axes 310, 314 may be transverse (e.g., not parallel) to the longitudinal axis 302.

The first and second light sources 206, 207 are mounted side by side on the light engine 208 within the housing 102. The light sources 206, 207 are located adjacent to, and aligned with, the light entry end 108 of each of the branches 112, 113 of the light consolidator 104. In alternate embodiments having more than two light sources, the light sources may be placed in alternate configurations, such as a linear configuration (e.g., aligned in a row or column of at least three light sources), triangular configuration, quadrilateral configuration, diamond configuration, or various other suitable arrangements such that each light source is aligned with a light entry end of a branch. In an exemplary embodiment, the first light source 206 is aligned with the branch 112 of the light consolidator 104 such that the light source 206 emits the first light generally along a first optical axis 316 that is coextensive with the first tertiary axis 310 of the mating section 308 of the branch 112. Likewise, the second light source 207 is aligned with the branch 113 such that the light source 207 emits the second light generally along a second optical axis 318 that is coextensive with the second tertiary axis 314 of the mating section 312 of the branch 113. As used herein, optical axis represents a general direction of light propagation (e.g., energy flow) from the light source. Although individual light rays may travel at various angles relative to the optical axis, the optical axis may represent an average of the vectors of all of the light rays. The light entry end 108 of the branches 112, 113 may be a planar surface that is oriented perpendicular to the respective first and second optical axes 316, 318 of the light sources 206, 207, which increases the amount of light rays that are received into the branches 112, 113 (e.g., by reducing the amount of light rays reflected away from the branches 112, 113).

In any particular application or use, each one of or both the first light source 206 and the second light source 207 may be operating at any one time. Consequently, the light consolidation assembly 100 is capable of distributing light from the first light source 206 individually, the second light source 207 individually, or a combination of both light sources 206, 207 while preserving the desired color and/or luminance from the different light combinations. For example, the double light engine 208 that includes the light sources 206, 207 may be capable of providing warm or cool white illumination depending on an input, by controlling and/or modifying the light generation of one or both of the light sources 206, 207. The light engine may operate according to a lighting control scheme. The lighting control scheme controls at least one of the color or luminance of the output light by designating parameters for the generation of light. For example, the parameters may include the types of light sources for the first and second light sources (e.g., incandescent bulb, RGB LED, white LED, etc.), the times for the first light source and the second light source to generate light (e.g., which may be concurrent, sequential, or the like over periods of time), the colors of the first light and the second light generated, the luminance of the first light and the second light generated, and/or the like.

The light consolidator 104 collects the light from the first light source 206 and/or the second light source 207 and directs the light to the light pipe 106. The light pipe 106 may be oriented axially with respect to the general direction of the incoming light. For example, the light pipe 106 may be oriented in-line with the longitudinal axis 302 of the stem 114. The attachment end 218 of the light pipe 106 may be a planar surface that is oriented perpendicular to the axis 302 in order to maximize the amount of light rays received into the light pipe 106 from the light exit end 110 of the light consolidator 104.

The first light from the first light source 206 enters the branch 112 of the light consolidator 104 at the light entry end 108 and propagates through the branch 112 toward the node 116. The second light from the second light source 207 enters the branch 113 at the light entry end 108 and propagates through the branch 113 toward the node 116. The body 105 of the light consolidator 104 is shaped such that the average light pathway is the same through each branch 112, 113. If the light sources 206, 207 are being operated simultaneously, the first and second lights may mix at the node 116 and within the stem 114. The width of the body 105, which gradually narrows as the branches 112, 113 converge at the node 116, provides a large amount of internal reflections and thus a high degree of light shuffling for a given length of the body 105. For example, the amount of internal reflections and light shuffling may be larger than a more linear body with straight pathway due to the branches being curved and consolidated into a single stem. As a result, the body 105 of the light consolidator 104 may have a relatively shorter length by comparison than the linear body. The relatively large number of internal reflections may create a uniform distribution of color along the stem 114. For example, if at least one of the operating light sources 206 and/or 207 is an RGB LED, the output light exiting the light consolidator 104 at the light exit end 110 presents a uniform spatial distribution of the RGB components of the RGB LED for an even chromatic distribution.

Figure 4:
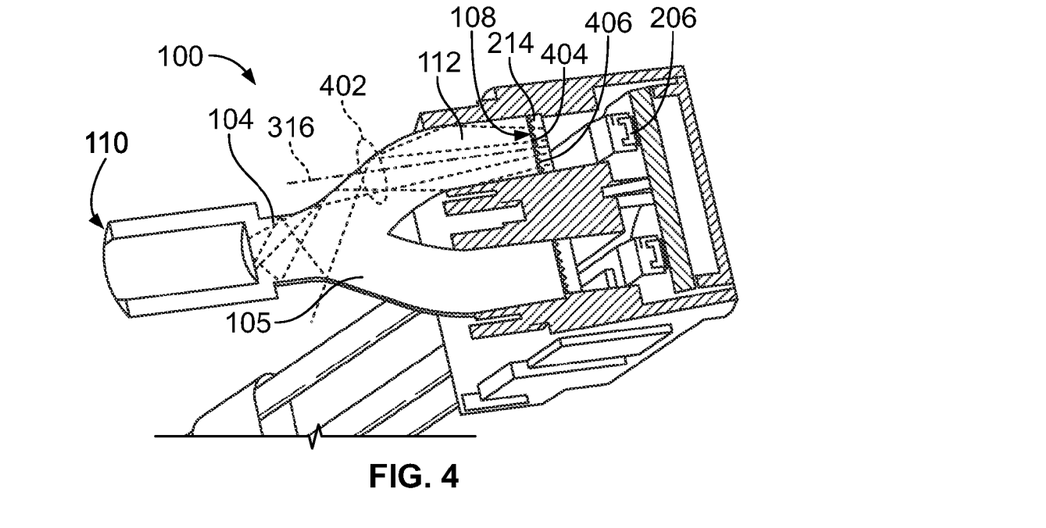
FIG. 4 is a partial sectional view showing tracing analysis of light reflection within the light consolidation assembly of FIG. 1.

FIG. 4 is a partial sectional view showing a tracing analysis of light reflection within the light consolidation assembly 100. The tracing analysis may represent the first light that is generated by the first light source 206 and received in the first branch 112 of the light consolidator 104. The light source 206 generates the first light generally along the optical axis 316. The light is represented by lines 402. In FIG. 4, the first light source 206 is controlled to generate light, and not the second source 207, so the output light from the light consolidator 104 is composed only of the distributed first light emitted from the first light source 206.

The lens 214 receives light generated by the light source 206 and concentrates or focuses the light into the light entry end 108 of the branch 112. For example, the lens 214 may refract and/or reflect the light from the light source 206 to focus the light within the branch 112 to reduce the amount of light that is lost and does not enter the branch 112. The lens 214 is configured to collimate the light emanating from the light source 206 such that the viewing angle of the light that enters the branch 112 is reduced relative to the initial viewing angle emanating from the light source 206.

Light rays transmitted from the light source 206 at a shallow angle encounter an inner convex surface 404 of the lens 214. The inner convex surface 404 may collimate the light along directions that are approximately parallel to the optical axis 316. Light that emanates from the light source 206 at greater viewing angles does not pass through the inner convex surface 404. For example, some light transmitted at greater viewing angles may be refracted by an outer spherical surface 406 of the lens 214 and be collimated along directions that are generally parallel to the optical axis 316. As such, the refracted light that passes through the inner convex surface 404 and the refracted light that passes through the outer spherical surfaces 406 may be generally parallel to one another and collimated by the lens 214 to provide more consistent light entering the branch 112 of the light consolidator 104.

The light that is focused by the lens 214 propagates through the branch 112 toward the light exit end 110 of the light consolidator 104. At least some of the light rays may be internally reflected as the rays impinge upon the boundary of the body 105 of the light consolidator 104. Due to shuffling caused by the internal reflections within the body 105, the light at the light exit end 110 may be more scattered and/or have a more uniform spatial distribution than the light entering at the light entry end 108. The scattered light that enters the light pipe 106 (shown in FIG. 1) may have a more even distribution of light, resulting in a brighter and/or more luminous light that emanates from the light pipe 106.

Figure 5:
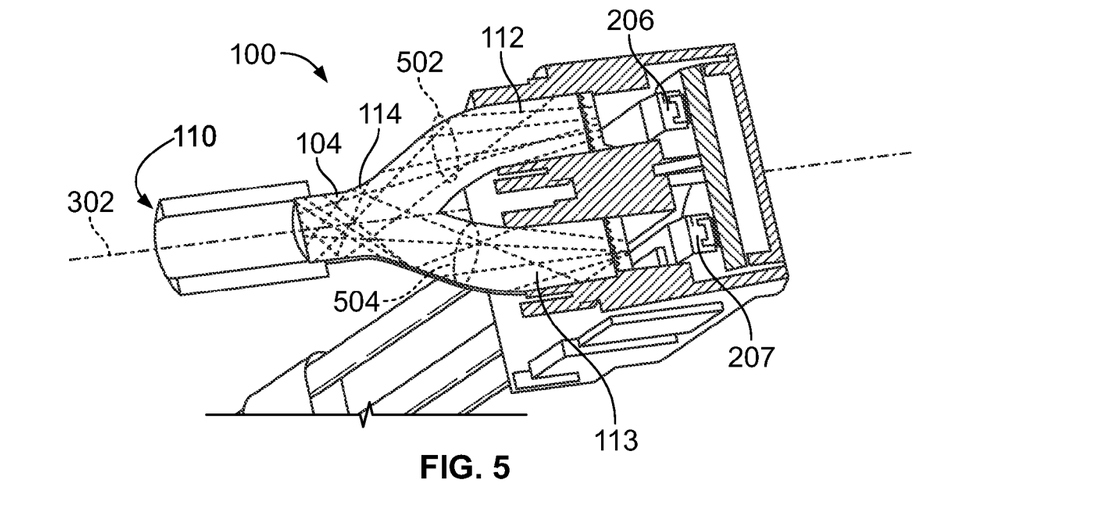
FIG. 5 is a partial sectional view showing another tracing analysis of light reflection within the light consolidation assembly of FIG. 1.

FIG. 5 is a partial sectional view showing another tracing analysis of light reflection within the light consolidation assembly 100. The tracing analysis may represent the first light that is generated by the first light source 206 and received in the first branch 112 of the light consolidator 104 and the second light that is generated by the second light source 207 and received in the second branch 113. The first light from the first light source 206 is represented by lines 502, and the second light from the second light source 207 is represented by lines 504. In FIG. 5, the first light source 206 and the second light source 207 are controlled to simultaneously generate light, so the output light from the light consolidator 104 is composed of both the first light and the second light combined.

The light rays of the first light propagate through the branch 112 and enter the stem 114 at directions that are angled with respect to the longitudinal axis 302 of the light consolidator 104, such that the light rays impinge upon one or more surfaces of the light consolidator 104 and scatter in various directions. Likewise, the light rays of the second light propagate through the branch 113 and enter the stem 114 at directions that are angled with respect to the longitudinal axis 302, such that the light rays of the second light also impinge upon the surfaces and scatter in various directions. The scattered first and second lights within the stem 114 may cause a more even distribution of output light that emanates from the light exit end 110 of the light consolidator 104 into the light pipe 106 (shown in FIG. 1).

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A light consolidation assembly for attaching to a light pipe comprising:
    a housing having multiple light sources mounted within the housing, the light sources including at least a first light source configured to generate a first light and a second light source configured to generate a different, second light;
    a light consolidator consolidating multiple light inputs into a single light output, the light consolidator having a body that includes a light entry end coupled to the housing and a light exit end, the light entry end has multiple branches that are spaced-apart and converge into a stem that extends from the branches to the light exit end, the light consolidator defining a cavity that is formed in the stem at the light exit end; and
    a light pipe having an attachment end that is received in the cavity at the light exit end to couple the light pipe to the light consolidator;
    wherein the light consolidator is configured to receive the first light into the light entry end of a first branch of the multiple branches and the second light into the light entry end of a second branch of the multiple branches, the first and second lights directed into the stem and exiting the light consolidator at the light exit end as an output light for transmission through the light pipe that is disposed at the light exit end of the light consolidator, wherein the first and second lights are both configured to be emitted into the same light pipe.

2. The light consolidation assembly of claim 1, wherein the multiple light sources are operatively coupled to a light engine, the light engine controlling one or more optical characteristics of the first and second lights generated at the respective first and second light sources.

3. The light consolidation assembly of claim 2, wherein the light engine modifies at least one of the color or luminance of the output light exiting the light consolidator by changing one or more optical characteristics of at least one of the first or second lights generated at the respective first and second light sources.

4. The light consolidation assembly of claim 2, wherein the light engine operates according to a lighting control scheme that controls at least one of the color or luminance of the output light by designating at least one of the types of light sources for the first and second light sources, the times for the first light source and the second light source to generate light, the colors of the first light and the second light generated, or the luminance of the first light and the second light generated.

5. The light consolidation assembly of claim 1, wherein the housing defines multiple channels configured to provide optical paths from the multiple light sources to the multiple branches of the light consolidator.

6. The light consolidation assembly of claim 5, wherein a lens is positioned within each channel of the multiple channels proximate to one of the light sources, the lens configured to focus light rays from the one light source towards the light entry end of one of the branches of the light consolidator.

7. The light consolidation assembly of claim 5, wherein each of the multiple channels is configured to receive the light entry end of one of the multiple branches of the light consolidator and to retain the branch within the channel by an interference fit.

8. The light consolidation assembly of claim 1, wherein the light consolidator has a solid body formed of at least one of acrylic or polycarbonate.

9. The light consolidation assembly of claim 1, further comprising a first lens between the first light source and the light entry end of the first branch and a second lens between the second light source and the light entry end of the second branch, the lenses directing the corresponding first and second lights toward the light entry end of the first and second branches, respectively.

10. The light consolidation assembly of claim 1, wherein the first light source is a red-green-blue (RGB) LED and the second light source is a white LED configured to operate at least one of at the same time or at different times as the RGB LED.

11. The light consolidation assembly of claim 1, wherein at least one of the first or second light sources include an RGB LED, the output light exiting from the light consolidator at the light exit end presents a uniform spatial distribution of the RGB components of the RGB LED for an even chromatic distribution.

12. A light consolidation assembly comprising:
a housing having multiple light sources mounted within the housing, the light sources including at least a first light source configured to generate a first light and a second light source configured to generate a different, second light;
a light consolidator consolidating multiple light inputs into a single light output, the light consolidator having a body that includes a light entry end coupled to the housing, the light entry end having multiple branches that are spaced-apart and converge into a stem that extends from the branches to a light exit end of the body, the light consolidator defining a cavity that is formed in the stem, the cavity extending from the light exit end towards the light entry end; and
a light pipe attached to the light consolidator, the light pipe having an attachment end that is received in the cavity at the light exit end;
wherein the light consolidator is configured to receive the first light into the light entry end of a first branch of the multiple branches and the second light into the light entry end of a second branch of the multiple branches, the first and second lights directed into the stem and exiting the light consolidator through the cavity at the light exit end as an output light for transmission through the light pipe.

13. The light consolidation assembly of claim 12, wherein the first light source and the second light source are operatively coupled to a light engine that controls one or more optical characteristics of the respective first light and second light.

14. The light consolidation assembly of claim 12, wherein at least one of the color or luminance of the output light exiting the light consolidator is modified by changing one or more optical characteristics of at least one of the first light or the second light generated at the respective first light source and second light source.

15. The light consolidation assembly of claim 12, further comprising a first lens between the first light source and the light entry end of the first branch and a second lens between the second light source and the light entry end of the second branch.

16. The light consolidation assembly of claim 12, wherein the first light source is a red-green-blue (RGB) LED and the second light source is a white LED configured to operate at least one of at the same time or at different times as the RGB LED.

17. A light consolidation assembly comprising:
a light consolidator consolidating multiple light inputs into a single light output, the light consolidator having a body extending between a light entry end and a light exit end, the light entry end having multiple branches that are spaced-apart and converge into a stem that extends from the branches to the light exit end, the light consolidator defining a cavity that is formed in the stem at the light exit end;
a housing coupled to the branches of the light consolidator, the housing having multiple light sources mounted therein, the light sources including at least a first light source configured to generate a first light and a second light source configured to generate a different, second light, the housing defining multiple channels configured to provide optical paths from the light sources to the branches of the light consolidator; and
a light pipe attached to the light exit end of the light consolidator, the light pipe having an attachment end that is received in the cavity at the light exit end;
wherein the light consolidator is configured to receive the first light through a first channel of the multiple channels into a first branch of the multiple branches and the second light through a second channel of the multiple channels into a second branch of the multiple branches, the first and second lights directed into the stem and exiting the light consolidator at the light exit end as an output light for transmission through the light pipe.

18. The light consolidation assembly of claim 17, wherein at least one of the color or luminance of the output light exiting the light consolidator is modified by changing one or more optical characteristics of at least one of the first or second lights generated at the respective first light source and second light source.

* * * * *